June 25, 1957
A. MALAFARINA ET AL
2,797,060
DEVICE FOR THE AUTOMATIC METERING OF LIQUIDS BY MEANS OF PNEUMATIC CONTROLS
Filed March 23, 1954
2 Sheets-Sheet 1
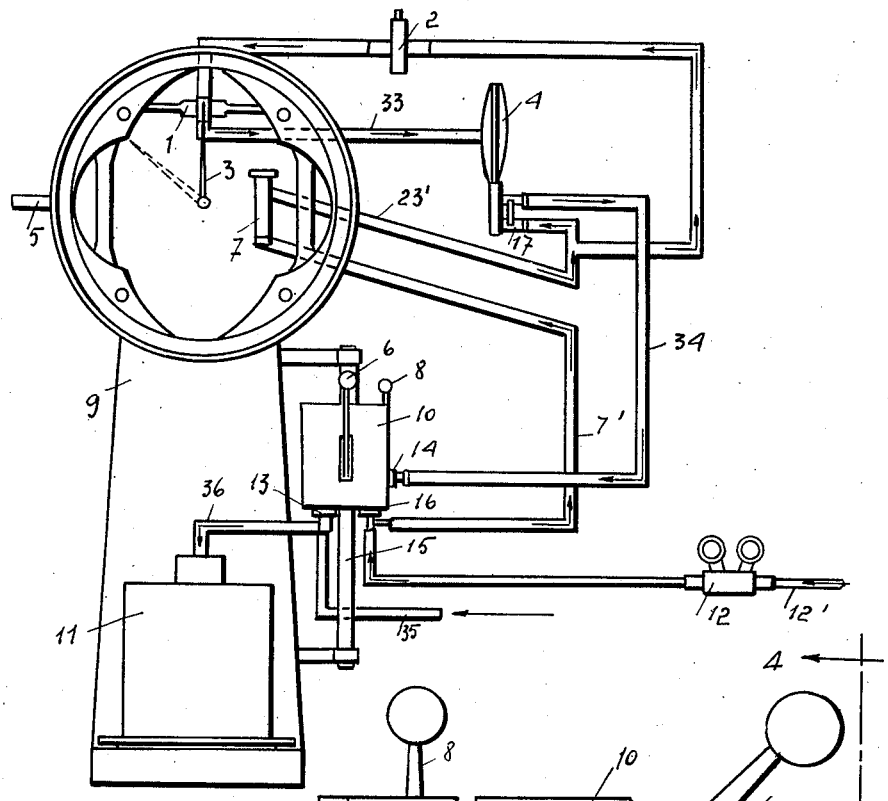
Fig.1
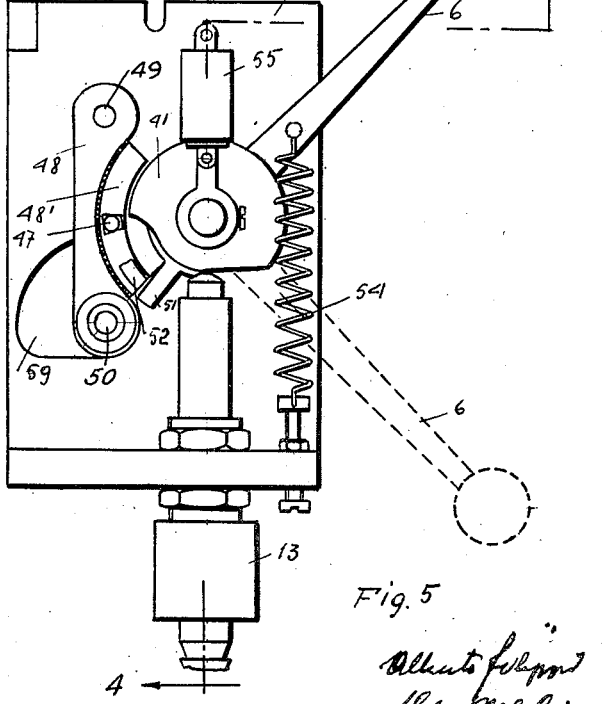
Fig.2
Fig.5

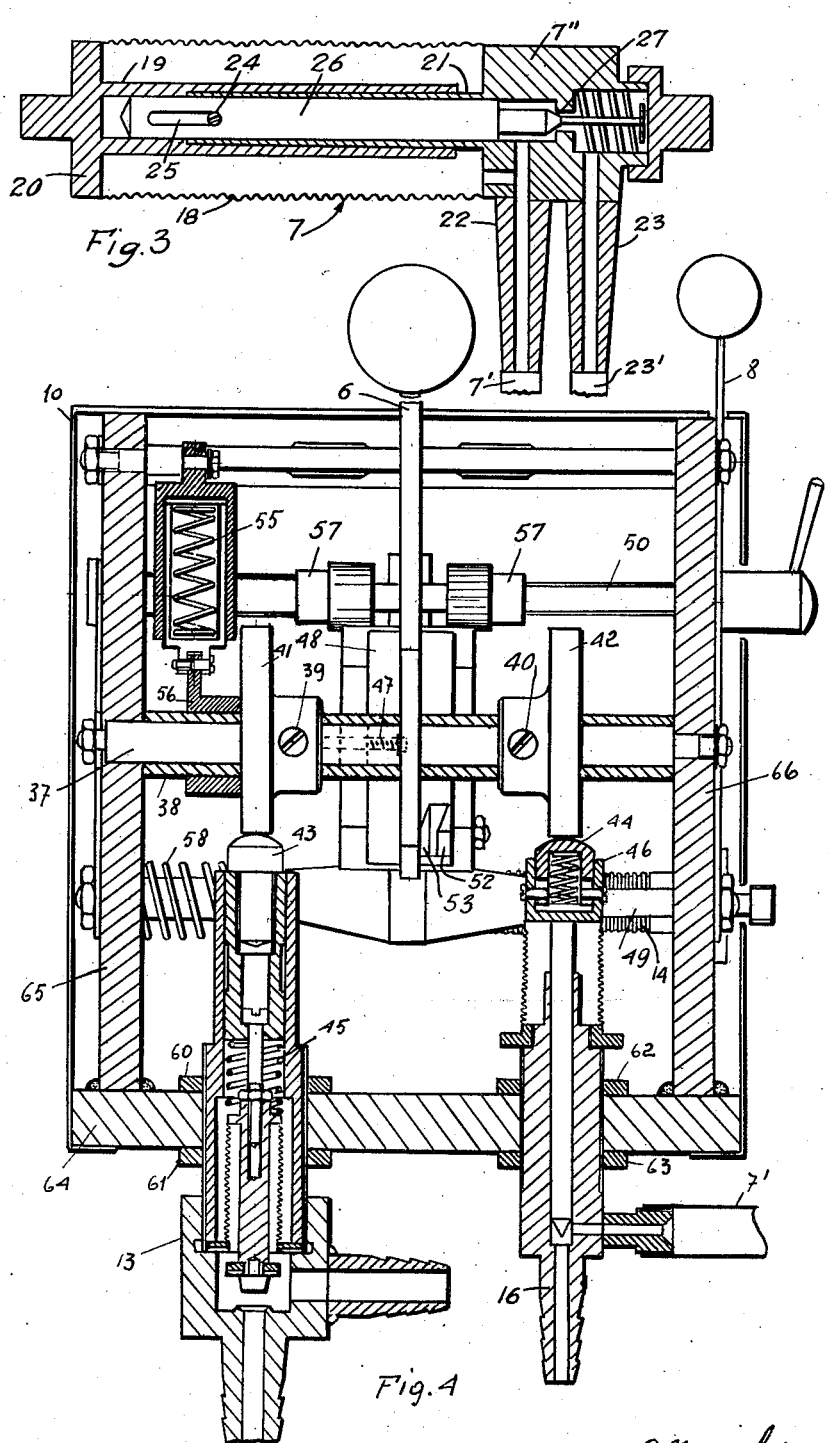

United States Patent Office 2,797,060
Patented June 25, 1957

2,797,060

DEVICE FOR THE AUTOMATIC METERING OF LIQUIDS BY MEANS OF PNEUMATIC CONTROLS

Aldo Malafarina and Alberto Filippi, Milan, Italy

Application March 23, 1954, Serial No. 418,054

3 Claims. (Cl. 249—63)

This invention relates to a device designed for the automatic metering, and more particularly for the automatic weighing of liquids and liquefied gases, and specially of fuels, by means of pneumatic controls.

Devices for the metering of liquids by means of automatic metering controls are already known. However, such devices, wherein the automatic controls comprise electric mechanisms, become highly dangerous when liquid fuels or liquefied fuel gases of any kind are to be metered since, as already well known, the more volatile fractions, as i. e. low boiling and easily inflammable hydrocarbons, are easily given off by such liquid fuels, and when the air of the room is enriched with such fractions, the sparking of a switch is nearly always sufficient to cause the ignition of the mixture, with consequent ruinous explosions.

In the metering device according to this invention, no sparking element is present, and it can be utilized for the metering of any fuel, irrespective of its flash point.

The device according to the present invention is characterized in that the flow of liquid fuel, as well as the weighing and metering thereof, are governed by a pneumatic circuit, which causes the pointer of a scale on which the liquid fuel is being weighed or metered, to be deflected to a given division of the dial, corresponding to the required weight of the liquid fuel, while low pressure air is fed to stop valve, previously released by the deflection of the pointer. The air is fed then to a bellows, which expands, thus causing high pressure air to be switched to a further bellows, by means of which a lever for the opening of a flow valve is tripped. The increase in weight causes then the scale pointer to be deflected in the opposite direction, until, the pointer, when back again in its zero position, will again act on the stop, or cutoff valve, whereby the first bellows is collapsed, and the high pressure air is switched off from the second bellows, which deflates. Deflation of this second bellows releases the control lever, which is then pulled downward by a return spring, thereby shutting off the flow of liquid.

The compressed air valve and the liquid valve are fitted within the same box. They are both controlled by the same lever, through two cans, showing the same profile, but being angularly offset with respect to each other, whereby the lever will cause the opening of an air valve during a first section of its upwards stroke, and the opening of a liquid valve during the remaining part of the same stroke.

Said lever is prevented from the passing from first to the second section of its stroke by a pawl, secured to a sliding unit controlled by the bellows. Said bellows, which is expanded when the metering operation of the device is started, causes the sliding unit to be moved to the left, whereby the pawl is disengaged from the lever, and this latter is allowed to perform the second section of its stroke, thus causing the opening of valve for the liquid to be metered.

At the end of the weighing operation, the deflation of the bellows causes the release of aforesaid lever which, under the action of a return spring, will effect two partial return strokes, and cause a throttling of liquid flow in the first part of the return stroke, and a positive shutting-off of both air and liquid valves in the second part of the return stroke.

The bellows by which the partial return strokes of the control lever are governed is controlled by the scale pointer which, when in its zero position, will keep the low pressure air circuit shut-off. Said circuit is connected to a bellows, which expands when the scale pointer is deflected from its zero position, thus opening the stop valve. The expansion of said first bellows causes the high pressure air to be switched to a second bellows, which will act as stated above.

The scale is of the tare allowance type, as for instance of the type as claimed in the patent application of same applicant, filed under date Oct. 13, 1952, file number 132,756. Said scale is provided with a pointer that can be loosened on its shaft, and then brought to a pre-established dial division, irrespective of previous deflection due to the tare, i. e. to a dial division corresponding to the net weight of the liquid to be metered.

The deflection of the pointer is directly controlled by the compressed air fed to the corresponding bellow. The expansion of said bellow is then converted, by suitable means, into a deflection of the scale pointer.

The previous adjustment of the scale pointer on the dial division corresponding to metering value, is also directly controlled by compressed air acting on a bellows which, through a suitable drive, causes the pointer to be brought to the required dial division, irrespective of tare weight.

The further objects and advantages of the invention will be better appreciated from a consideration of the following description of a preferred embodiment thereof, taken with the accompanying drawing, description and drawing being given only as a not restrictive example.

Fig. 1 is a diagrammatic view of the apparatus of the present invention.

Fig. 2 is a sectional view of the stop valve for the low pressure air circuit of this apparatus.

Fig. 3 is a sectional view of the device by which the scale pointer deflection of the apparatus is controlled.

Fig. 4 is a sectional view of the valve control mechanism of the apparatus, the section being taken along line 4—4 of Fig. 5 viewed in the direction of the arrows and being drawn to an enlarged scale.

Fig. 5 is a side view of the valve control mechanism of the apparatus.

Referring now to Fig. 1, a container 11, whereinto the liquid to be metered will be collected, is put on a scale 9 of the tare allowance type. The weight of said container (i. e. the tare) can be compensated for by acting on the lever 5 of the scale in the hand operation of device, whereby the pointer 3 is loosened on its axis, and brought back to its zero position.

The compressed air is fed from the main 12' to a pressure reducer 12, designed to reduce the pressure obtained on the output side of a compressor down to a constant value, i. e. to 3 to 5 atmospheres. Then the compressed air is fed from pressure reducer 12 to the valve control mechanism 10, fitted on the support 15.

The valve 13, controlled by the lever 6, is also fitted on the mechanism 10. All valves are kept closed when the lever 6 is in its down position. When the lever is lifted, it is allowed to travel only for a part of its upwards stroke, as will be explained later. At the end of this partial stroke, the valve 16 will be opened, whereby the compressed air is allowed to flow through the duct 7' to bellows 7, shown in detail in the Fig. 3. Said bellows is made up by an inflatable section 18, within which the tube 19 is located. The tube 19 is secured to head 20 of the inflatable section 19. A second tube 21, fitted in the inside of tube 20, is secured to a head 7" of bellows 7, onto which the inlet connection 22 of duct 7', and 23 of duct 23' (see Fig. 3) are also fitted.

The compressed air, fed through the inlet 22, causes the bellows section 18 to be inflated, and such inflation results—through rack and pinion drives of well known type, not shown in the drawings for simplicity's sake—in a deflection of scale pointer 3 through an angle corresponding to the pre-established weight of liquid to be metered. The further expansion of bellows 7 causes a pawl 24, guided in the slot 25 of valve stem 26, to lift this stem at the end of its stroke, whereby the valve 27 is opened, and the compressed air is fed to inlet connection 23, and then through the duct 23' to pressure reducer 2, wherein the air pressure is reduced to a few tenths of an atmosphere, and the air is then fed to stop valve 1 shown in detail in Fig. 2.

Said stop, or cutoff valve 1 consists of two opposite holes 28 and 29 closely spaced from each other and respectively connected to air inlet 30 and to air outlet 31. A plate 32, secured to pointer 3, is kept inserted between said holes 28 and 29 when pointer 3 is in its zero position, thus stopping the flow of air through holes 28 and 29.

In the position shown in Fig. 1 in dotted lines, in which the pointer 3 has been deflected by the bellows 7, plate 32 is removed from the space between holes 28, 29 and the air is allowed to flow to duct 33, and then to bellows 4, which becomes inflated. This results in the opening of valve 17, whereby the high pressure air, coming from duct 23, is allowed to flow to duct 34 and then to bellows 14, fitted to mechanism 10. Latter bellows 14 becomes inflated, thereby disengaging a pawl from lever 6. A further lifting motion can be thus performed by same lever, whereby the valve 13 is opened and the liquid to be metered, coming from the duct 35, is allowed to flow to duct 36, and then into the container 11, thus starting the metering operation. Obviously, the liquid can be fed either under normal, or increased pressure, as in the case of liquefied gases. The flow of liquid into the container, will cause an increase in the weight thereof, whereby the scale pointer 3 is deflected towards its zero position. When pointer 3 has nearly reached its zero position, the plate 32 (see Fig. 2) will be inserted between the holes 28 and 29, thereby cutting-off the flow of air.

The cutting-off of air flow through the stop valve 1, causes the flow of air through the duct 33 to be discontinued, whereby the bellows 4 is collapsed, thus closing the valve 17 with the corresponding duct 34. Said valve 17 is designed in such a manner as to allow, after having been closed, a venting to the outside of the air enclosed within the duct 34, whereby the bellows 14 can be deflated, thus releasing the lever 6, which is then pulled downwards for a given length, under the action of a suitable return spring 54, and then stopped against a stop pawl. In such a position, lever 6, while keeping the air valve 16 open, will cause a strong throttling of valve 13, thus greatly reducing the flow rate of liquid into the container 11, and giving the possibility to easily perform accurate readings on the dial, as the angular speed of the pointer is reduced. Then the plate 32 is slowly brought by the pointer beyond the stop valve 1, whereby the flow of air from the hole 28 to hole 29 is no more prevented, and the low pressure air is again allowed to flow to duct 33, whereby bellows 4 is inflated. The thus inflated bellows 4 opens the valve 17, and allows the air to flow through the duct 34 to bellows 14, which in turn is again inflated, and causes the stop pawl to be disengaged from lever 6, whereby this latter is allowed to fall down to its rest position.

In this latter position, the valves 13 and 16 are closed, whereby the first metering cycle is completed, and the device is ready for the next metering cycle. A hand metering can be performed by means of lever 8 which excludes all automatic operations through the compressed air circuits.

Figs. 4 and 5 show the design and operation of the valve control mechanism 10 in detail.

The cams 41 and 42, as well as the lever 6, are secured by means of the pins 39 and 40 on the bush 38, which in turn is keyed on the shaft 37. The cam tracks correspond to the geometric profile of two valves, i. e. of valves 13 and 16, as already considered with reference to Fig. 1.

The profiles of said cams are fundamentally alike; however they are angularly displaced with respect to each other, which results—when the lever 6 is lifted—in opening of the valve 16 before the opening of valve 13. The valve stems engage the cam tracks respectively through the cam followers 43 and 44, which are permanently forced upwards, together with the valve stems, by their springs 45 and 46, which tend to keep the valves in their open positions. When the lever 6 is in its down position, i. e. in the rest position of the device—as shown with dotted lines in the Fig. 5—both valves are kept closed by their cams. When the metering operation is started, the lever can be lifted only for a given fraction of its stroke, and is stopped against a pawl 47, connected to a system 48, which is slidingly fitted on the pins 49 and 50. In the aforestated position, same lever causes only the valve 16 to be opened, whereby the air is allowed to flow to duct 7', thus causing the initial operations, already described in connection with the Fig. 1, to be carried out. The compressed air fed to bellows 14 causes the inflation thereof, whereby the movable system 48 is forced to the left (when looking at the figure). Thus the pawl is disengaged from lever 6, and this latter can be further lifted, thereby opening the valve 13. The lever 6, in its lifted position, comes into engagement through its extension 51, with a stop 52, having a sidewardly inclined plane 53, whereon said extension is caused to slide, being then engaged therewith when the lever has attained the end of its stroke. Said stop forms also a part of movable system 48. The lever 6 is pulled downward by a spring 54, while a spring 55 tends to cause the bush 56, fitted over the bush 38, to be slightly rotated, thus increasing the swinging speed of lever 6. The lever 6 is kept in its upwards position only by the stop 52, and in such a position, in which both valves are open, the liquid to be metered is normally flowing into the container, until the stop valve is shut-off by the scale pointer. Then the bellows 14 is deflated, and the stop 52 will release the lever 6, which is then engaged with its extension 51 by the pawl 47. However, contrary to what occurs during the upward stroke, such engagement takes place against the lower face of pawl 47 and with a small angle of lag, limited by the size of pawl 47. Though very small, such angle of lag is however sufficient to prevent a complete closing of valve 13, which results in a strong throttling of the flow of liquid. The next opening of the stop valve causes the bellows 14 to be again inflated, whereby the movable system 48 is forced to the left, and the pawl 47 is disengaged from lever 6. The lever 6 is then pulled downwards, thereby closing both valves 16 and 13. The strokes of movable system 48 are limited by the stops 57. The system 48 shows an arched base, concentric with the rotation axis of lever 6, whereon the pawl 47 and the stop 52 are fitted.

The transverse stroke of movable system 48, as caused by the bellows 14, is braked by the return spring 58.

The driving action exerted by the bellows 14 on movable system 48, is transmitted to one side of the extension 59 secured thereto, whereas spring 58 acts on the other side of extension 59.

The valves 13 and 16 are firmly secured, respectively by means of the shrunk rings 60, 61, and 62, 63, to a sturdy plate 64, fitted on the bottom of valve control mechanism 10, while the different shafts are keyed and secured to the side plates 65 and 66.

As it will be readily appreciated, recourse could be made to any other arrangement of controls for the air and liquid valves, and for the connections of air circuits, having other equivalent mechanisms substituted for those already described, as fall within the scope of the claims hereunto.

What we claim is:

1. Apparatus for filling a container with a liquid, comprising, in combination, weighing means for carrying a container to be filled and having a pointer which may be zeroed when the empty container is on the weighing means; first conduit means located adjacent said weighing means for delivering a liquid to the container; first valve means communicating with said first conduit means for controlling the flow of liquid therethrough; first bellows means carried by said weighing means for moving the pointer thereof away from its zero position; second conduit means communicating with said first bellows means for supplying to the latter air under pressure for actuating said first bellows means to move said pointer from its zero position through a predetermined distance; second valve means located adjacent said first valve means and communicating with said second conduit means for controlling the flow of air therethrough; control means operatively engaging said first and second valve means and movable from a rest position through a first stage for opening said second valve means while said first valve means remains closed and then through a second stage for opening said first valve means while said second valve means is maintained open, said control means including a stop for releasably maintaining said first and second valve means open after said control means moves through said first and second stages; spring means operatively connected to said control means for returning the latter to its rest position first through said second stage and then through said first stage; second bellows means operatively connected to said control means for preventing movement thereof from said first to said second stage until said pointer is moved by said first bellows means through said distance and from said second to said first stage until after said pointer has reached its zero position; and air pressure means cooperating with said pointer and first bellows means for delivering air to said second bellows means when said pointer has moved through said distance from said zero position, for relieving air from said second bellows means when said pointer has returned to its zero position, and for again delivering air to said second bellows means immediately after said pointer has returned to its zero position.

2. Apparatus as defined in claim 1 and wherein said air pressure means comprises a third conduit means leading from said first to said second bellows means for delivering air from said first to said second bellows means; third valve means communicating with said third conduit means for controlling the flow of air therethrough; third bellows means operatively connected to said third valve means for opening and closing the same; fourth conduit means leading from said third conduit means to said third bellows means for supplying air to the latter for opening said third valve means, said fourth conduit means having a portion located at the zero position of said pointer; and fourth valve means communicating with said fourth conduit means at said portion thereof and including a valve member carried by said pointer for closing said fourth valve means only when said pointer is in its zero position.

3. Apparatus as defined in claim 2 and wherein a pressure reducing means is located in said fourth conduit means for reducing the pressure of air passing through a part of said fourth conduit means.

References Cited in the file of this patent

UNITED STATES PATENTS

| | | |
|---|---|---|
| 1,069,449 | Manby et al. | Aug. 5, 1913 |
| 2,387,894 | Fannin | Oct. 30, 1945 |
| 2,406,263 | St. Clair | Aug. 20, 1946 |
| 2,408,842 | Garretson et al. | Oct. 8, 1946 |
| 2,544,734 | St. Clair | Mar. 13, 1951 |
| 2,545,118 | St. Clair | Mar. 13, 1951 |
| 2,580,567 | Martin | Jan. 1, 1952 |
| 2,605,075 | Brown | July 29, 1952 |
| 2,608,373 | Tuttle et al. | Aug. 26, 1952 |